UNITED STATES PATENT OFFICE 2,256,575

PROCESS OF MAKING ALKALI METAL FORMALDEHYDE SULPHOXYLATE DI- AMINO DIPHENYL SULPHIDE OR SUL- PHONE REACTION PRODUCTS

George W. Raiziss, Le Roy W. Clemence, and Morris Freifelder, Philadelphia, Pa., assignors to Abbott Laboratories, North Chicago, Ill., a corporation of Illinois No Drawing. Application May 25, 1938, Serial No. 209,986

1 Claim. (Cl. 260—500)

The present invention relates to novel combination products of alkali formaldehyde sulphoxylate and diamino diphenyl sulphur derivatives. More specifically the present invention relates to the above described products in which the sulphur derivatives represent the sulphone (SO₂) group and the sulphide (S) group.

The combination or reaction products of the present invention have high therapeutic effects and may be used to advantage in combating streptococcic infections. Of great importance, the products of the present invention have been found to possess a low toxicity.

The principal object of our invention is to provide stable combination or reaction products of alkali formaldehyde sulphoxylate and diamino diphenyl sulphone and sulphide derivatives.

It is also an object of our invention to provide a process for preparing solid combination products adaptable for oral administration and adaptable, in solution form, for injection purposes.

The following examples will serve to illustrate our invention:

EXAMPLE I

Disodium formaldehyde sulphoxylate diamino diphenyl sulphone

About 20 grams of diamino diphenyl sulphone is dissolved in about 500 c. c. of ethyl alcohol (3A. made up of 5 parts methyl alcohol and 100 parts of ethyl alcohol) by placing the ingredients in a flask provided with a reflux condenser and warming over a water bath. About 24 grams of pure grade, very finely powdered (40–60 mesh) sodium formaldehyde sulphoxylate is then rapidly added to the alcohol solution of diamino diphenyl sulphone and the mixture refluxed in the usual manner. We have found that the mixture should be refluxed for a total of 5 hours and that a precipitate starts to form near the 3 hour period. The reaction mixture is then cooled to 15° C. and kept at this temperature for about 1 hour. The precipitate formed in the filtrate is filtered off rapidly and drained as much as possible to remove mother liquor and then washed with small amounts of cold alcohol. The solid product is immediately placed in a desiccator and dried over sulphuric acid for about 20 hours.

Investigations have shown the sulphone combination product obtained by the above reaction to be very soluble in water e. g. forming solutions as high as 20 percent, and to form solutions having a pH value around 7. The high solubility of the product makes the solutions adaptable for injection purposes. In preparing the solutions it is advisable to shake the product gently with water as vigorous agitation is accompanied by the formation of a precipitate, due it is thought to the action of oxygen or carbon dioxide present in the air on the sulphone reaction product. Aqueous solutions e. g. 10 percent solution, of the reaction product are relatively stable even when exposed to air for several hours and remain sufficiently clear for all practical purposes.

The solid product obtained by the above reaction contains water or alcohol of crystallization. The product dried in vacuo over sulphuric acid is believed to have the following formula, although it will be understood that our invention is not limited thereto:

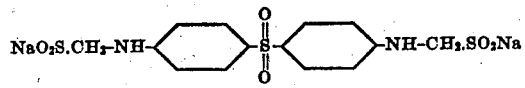

EXAMPLE II

Disodium formaldehyde sulphoxylate diamino diphenyl sulphide

About 10 grams of diamino diphenyl sulphide is dissolved in alcohol and reacted with 15.4 grams of powdered sodium formaldehyde sulphoxylate as described in Example I, except that the reaction product separates while heating and is filtered from the hot solution. Ordinarily it is sufficient to reflux the reaction mixture for only about 2 hours. The sulphide reaction product obtained is not soluble in water at room temperature but forms a 1 percent solution on warming. The formula of the product is believed to be as follows:

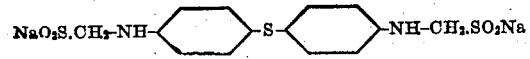

The above illustrative examples describe the di-substituted products in which both of the amino groups in the p and p' positions have reacted with a molecule of sodium formaldehyde sulphoxylate. It will be understood by those skilled in the art that our invention includes the mono-substituted products formed in accordance with the above examples employing 1 molecule of diamino diphenyl sulphone or sulphide and 1 molecule of the formaldehyde sulphoxylate.

Our investigations indicate the method of preparation to be of extreme importance. For example, the use of an aqueous reaction medium in place of the alcoholic i. e. methyl or ethyl alcohols or mixtures of the same, reaction medium, has been found unsatisfactory. Aqueous reaction mediums have been found, for example, unfit for use when preparing a stable solid product for oral administration. Our investigations show different reaction mediums produce different combination or reaction products having different properties.

We claim:

The method of forming a stable reaction product of alkali metal formaldehyde sulphoxylate and one of the group consisting of diamino diphenyl sulphide and diamino diphenyl sulphone, which comprises refluxing the alkali metal formaldehyde sulphoxylate and one of said diamino diphenyl sulphur compounds in an alcoholic reaction medium.

GEORGE W. RAIZISS.
LE ROY W. CLEMENCE.
MORRIS FREIFELDER.